July 31, 1951 W. J. O'BRIEN 2,562,329
DOUBLE PHASE COMPARATOR CIRCUIT
Original Filed Aug. 27, 1945

INVENTOR.
WILLIAM J. O'BRIEN
BY
Walter P. Huntley
Attorney

Patented July 31, 1951

2,562,329

UNITED STATES PATENT OFFICE 2,562,329

DOUBLE PHASE COMPARATOR CIRCUIT

William J. O'Brien, London, England, assignor to The Decca Record Company, Limited, London, England, a corporation of Great Britain Original application August 27, 1945, Serial No. 612,991. Divided and this application January 18, 1949, Serial No. 71,425. In Great Britain August 23, 1945

7 Claims. (Cl. 172—245)

My invention relates to a phase discriminator circuit for use with radio frequency receiving apparatus and suitable phase displacement indicators for indicating the phase relationships between synchronized radio frequency transmissions from spaced antennae and at unlike but related frequencies.

This application is a division of my copending application Serial No. 612,991, filed August 27, 1945, now Patent 2,500,200, issued March 14, 1950, and entitled "Multiple Channel Radio Frequency Receiver."

As is disclosed in my copending application Serial No. 612,987, filed August 27, 1945, now abandoned, and entitled "Navigation System" it is possible by means of synchronized radio frequency transmissions from spaced points and at unlike but related frequencies to establish superimposed and intersecting lines of equal phase displacement, thus defining a coordinate system which may be used for guiding the navigation of vehicles of various types. The utility of such a system depends, of course, upon equipping the vehicle with reception apparatus suitable for receiving the three synchronized transmissions and for indicating the relative phase relationships between these transmissions in terms of the coordinate system developed by the overlapping and interacting radio frequency fields. Such an apparatus must include the necessary instrumentalities for simultaneously receiving the three signals, for making a phase analysis and comparison of the signals, and indicating on a suitable instrument the result of the analysis and comparison in terms of the established coordinate system.

It is, therefore, an object of the present invention to provide a radio frequency receiving apparatus which includes means for receiving simultaneously three separate but related radio transmissions, together with means for analyzing, comparing and indicating the phase relationships existing among the respective transmissions.

It is an additional object of my invention to provide an apparatus of the character set forth in the preceding paragraph in which the phase relationship indication is given continuously.

Figure 1:
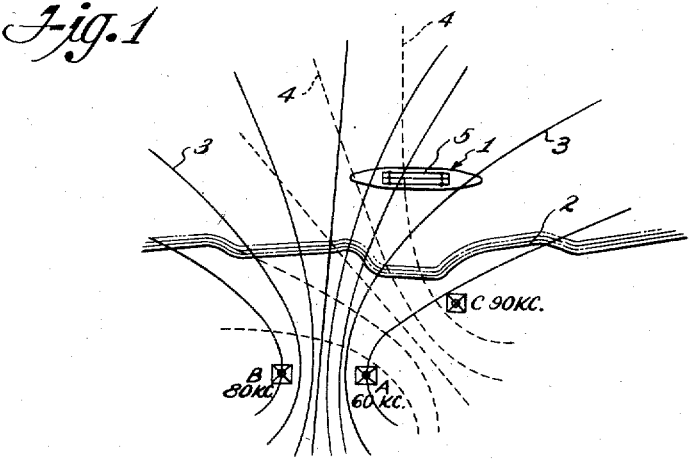
Figure 2:
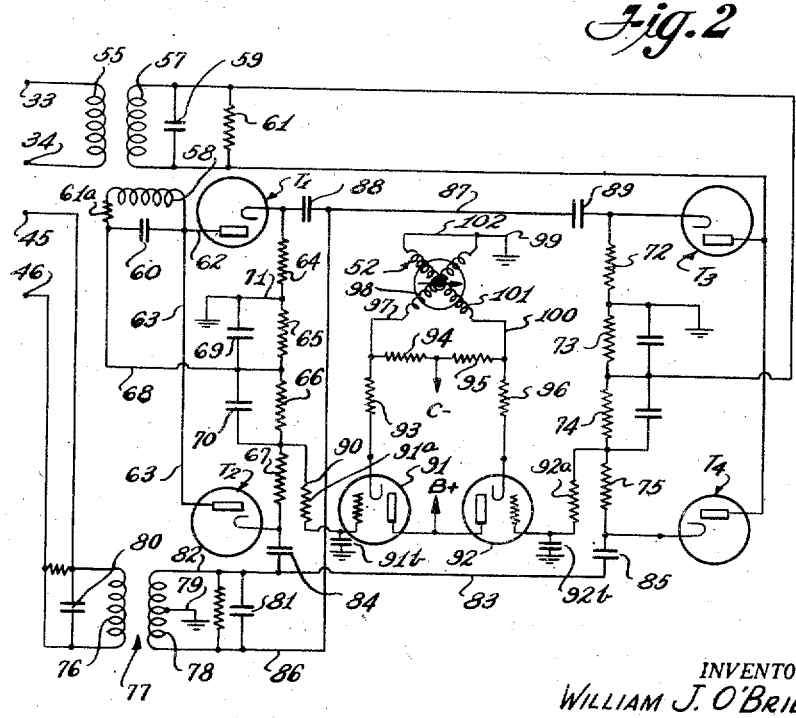

Other objects and advantages of my invention will be apparent from a study of the following specifications, read in connection with the accompanying drawing, wherein:

Fig. 1 is a schematic drawing representing the elements of a radio frequency navigation system of the character disclosed in my aforementioned copending application Serial No. 612,987 with which the radio reception apparatus to be described hereinafter is particularly adapted for use; and Fig. 2 is a wiring diagram illustrating in detail the components and electrical connections employed in the phase discriminator circuit.

Referring to the drawings, I have illustrated in Fig. 1 a radio frequency navigation system of a type with which the radio receiving apparatus may be used. As is described in my aforementioned copending application Serial No. 612,987, the transmission apparatus may include three radio frequency transmitters A, B and C. In the event the apparatus is to be used for guiding the navigation of sea-going vessels, such as is represented in Fig. 1 by the outline 1, the transmitters A, B and C may be placed at or near the shoreline 2. They are spaced from each other at predetermined distances and are synchronously operated at unlike but related frequencies as, for example, 60, 80 and 90 kilocycles, respectively.

With this mode of operation, the radio frequency fields produced by transmitters A and B interact to establish a field pattern such as that represented by the solid lines 3 in Fig. 1, each of which lines represents the locus of the equal phase displacement between the signals emanating from the transmitters A and B and referred to a frequency which is the least common multiple of the frequencies at which the transmitters are operated as, for example, a frequency of 240 kilocycles. Similarly, the interaction of the fields produced by the transmitters A and C may be characterized by lines 4 of equal phase displacement as referred to a frequency equal to the least common multiple of the two transmission frequencies; in the example assumed, 180 kilocycles.

Suitable radio frequency apparatus is installed on the vessel 1 and connected to a suitable antenna 5 mounted thereon. The receiving apparatus operates indicating mechanisms for indicating the phase relationships between the A and B transmissions and the phase relationships between the A and C transmissions to thereby provide an indication of the geographical location of the vessel 1 in terms of the coordinate system represented by the equal phase displacement lines 3 and 4.

The receiving apparatus is preferably constructed along the lines described in my aforementioned copending parent application Serial No. 612,991, now Patent 2,500,200, and may comprise three radio frequency amplifiers tuned respectively to the frequencies radiated by the transmitters A, B and C (60, 80 and 90 kilocycles in the assumed example). The 80 and 90 kilocycle amplifiers are connected to a frequency trebler and a frequency doubler, respectively, to produce output signals of 240 kilocycles and 180 kilocycles. The output from the 60 kilocycle amplifier is split and fed into a frequency quadrupler and a frequency trebler to produce outputs of 240 kilocycles and 180 kilocycles. There are thus produced two 240 kilocycle signals derived from transmitters A and B, and two 180 kilocycle signals derived from transmitters A and C. By measuring the phase relation between the two 240 kilocycle signals, and the phase relation between the two 180 kilocycle signals, there is provided an identification of the lines 3 and 4 (Fig. 1) which pass through the location of the receiving antenna 5.

I have shown in Fig. 2 a phase discriminator circuit which may be advantageously used for making the phase measurement. While I have shown but one of the phase discriminator circuits, it will be understood that two such circuits are used, one for determining the phase relation between the two 240 kilocycle signals and the other for measuring the phase relation of the two 180 kilocycle signals. It will be understood also that the two circuits are identical except for the difference in tuning of the resonant circuits. Each discriminator includes two pair of input terminals 33, 34 and 45, 46 across which are applied respectively the two signals, the phase relationship of which is to be determined.

The input terminals 33 and 34 are connected to a transformer primary winding 55 which is closely coupled to a secondary winding 57 tuned by a tuning condenser 59. Another secondary winding 58 is loosely coupled to the secondary winding 57. The winding 57 is loaded by a shunt resistance 61, whereas the winding 58 is connected through a series resistance 61a to a tuning condenser 60. The inductance of the winding 58 is made slightly greater than that of the winding 57, and the coupling is adjusted to produce equal voltage outputs across the condensers 59 and 60, respectively, and are also so adjusted as to produce a phase difference between these voltages of precisely 90°. The condensers 59 and 60 are chosen to tune the two windings to the same frequency as that applied across terminals 33 and 34. The loading resistances 61 and 61a are employed to reduce the Q of the tuned circuits to improve the frequency shift tolerance of the circuits.

One terminal of the condenser 60 is connected as by means of conductors 62 and 63 to the plates or anodes of thermionic rectifier tubes $T_1$ and $T_2$. The cathodes of these two tubes are interconnected by four series connected resistors 64, 65, 66 and 67, the mid point between resistances 65 and 66 being connected through conductor 68 to the other terminal of the condenser 60.

The resistances 65 and 66 are preferably by-passed by condensers 69 and 70 and the mid point between resistances 64 and 65 is grounded as by a conductor 71. Thermionic rectifier tubes $T_3$ and $T_4$ with cathode resistances 72, 73, 74 and 75 are connected across the transformer winding 57 in a manner identical to the circuits associated with the winding 58. Input terminals 45 and 46 are connected across a primary winding 76 of an input transformer 77 inductively coupled to a secondary winding 78 thereof.

The winding 78 is preferably provided with a center tap which is connected to ground as by a conductor 79 and the windings 76 and 78 are tuned to the input frequency as by tuning condensers 80 and 81. The windings 76 and 78 are loaded respectively by shunt connected resistances 76a and 78a, these resistors being employed for the purpose of reducing the Q of the tuned circuits. The secondary winding 78 is so constructed as to provide a voltage across these terminals equal to that appearing across the terminals of the secondary winding 57. One terminal of the winding 78 is connected through conductors 82, 83 and coupling condensers 84 and 85 to the cathodes of the rectifier tubes $T_2$ and $T_4$. The other terminal of the winding 78 connected through conductors 86 and 87 and coupling condensers 88 and 89 to the cathodes of the tubes $T_1$ and $T_3$.

The mid point between resistances 66 and 67 is connected by a conductor 90 to the grid of an amplifier tube 91 and a similar connection interconnects the grid of an amplifier tube 92 to the mid point between resistances 74 and 75. These grid leads include series resistances 91a and 92a which, together with grid to ground condensers 91b and 92b, serve to filter out noise and other extraneous signals to prevent the fluttering of the needle of a goniometer 52 which is driven by the tubes 91 and 92. The anodes of the tubes 91 and 92 are interconnected and connected to a suitable source of plate supply potential represented by the arrow bearing the legent B+ in Fig. 2. The cathodes of the tubes 91 and 92 are interconnected by a series circuit including resistances 93, 94, 95 and 96, the mid point between resistances 94 and 95 being connected to a suitable source of direct potential having a negative polarity with respect to ground and indicated generally by the arrow bearing the legend C— in Fig. 2.

The mid point between resistances 93 and 94 is connected through a conductor 97 to one terminal of one coil 98 of the goniometer 52, the other terminal of said coil being connected to ground by a conductor 99. Similarly, the mid point between resistances 95 and 96 is connected by a conductor 100 to one terminal of the other coil 101 of the goniometer 52, the other terminal of said coil being connected to ground through a conductor 102.

In the phase discriminator circuit just described, the voltage which is applied across the tube $T_1$ is the vector sum of the voltage across the winding 58 and the voltage on conductor 86. The voltage applied to the tube $T_2$ is the vector sum of the voltage developed across the winding 58 and the voltage on conductor 82. In a like manner, the voltage across the tube $T_3$ is the vector sum of the voltage developed across the winding 57 and that appearing on conductor 86, while the voltage across the tube $T_4$ is the vector sum of the voltage developed across the 57 and the voltage on conductor 82.

The voltages developed across the windings 57 and 58 constitute one system of a fixed phase quadrature relationship, whereas the voltages on conductors 82 and 86 comprise an independent system in which the voltages are in fixed opposition to each other. The phase angle between these two systems is variable and equal to the phase angle of the input applied to the terminals 33—34 with respect to that applied to the terminals 45—46. Each of the voltages across the four tubes $T_1$—$T_4$ is therefore variable as the input phase relationship varies.

The direct current flowing through the resistances 64—65, 66—67, 72—73 and 74—75 are in direct proportion to the voltages applied across the four tubes and therefore represent by their magnitude the phase relationship between the incoming signals. A portion of each of these voltages is applied to the grids of the amplifier tubes 91 and 92 so that the current flowing in the cathode circuits of these tubes and therefore through the goniometer coils 98 and 101 are in a ratio substantially equal to the tangent of the phase angle between the input signals.

The goniometer coils 98 and 101 are disposed at right angles to each other in the goniometer. The magnetic flux produced by the interaction of these coils has a direction which is determined by the vector sum of the two coil currents disposed at right angles to each other. The direction of the resultant field is therefore representative of the phase angle between the input signals. An indicator 53 forming a part of the goniometer 52 is attached to a permanent magnet mounted for rotation in the resultant magnetic field and the pointer therefore assumes a position representing the phase relationship between the input signals.

The goniometer 52 is preferably of the registering type such as that disclosed in my copending application Serial No. 612,984, filed August 27, 1945, now Patent 2,499,326, issued February 28, 1950, and entitled "Registering Goniometer," and which is adapted to indicate, as by a suitable pointer 53, the instantaneous phase relationship. An associated registering mechanism (not shown) connected by suitable gearing to the pointer 53 serves to indicate the accumulative total of phase changes occurring during the time the device is in operation. Assuming, therefore, that the registering mechanism of the indicating instrument 52 was initially set to indicate a coordinate location equivalent to the geographical location of the vessel 1, the instrument will continuously operate to indicate the instantaneous location of the vessel 1 with respect to the equi-phase grid represented by the dotted lines 4. A similar instrument connected to the output of a second phase discriminator will indicate the position of the vessel 1 with respect to the equi-phase grid 3. Together, the two indicators continuously indicate the location of the vessel 1.

From the foregoing it will be seen that I have provided a novel phase discriminator and phase displacement indicator for use with suitable receiving and frequency converting apparatus to indicate the multiple phase relationships between synchronized radio frequency transmissions from spaced antennae and at unlike but related frequencies.

While I have shown and described the preferred embodiment of my invention, I do not desire to be limited to any of the details of construction shown and described herein, except as defined in the appended claims.

I claim:

1. In a phase discriminator circuit for determining the phase angle between a first and a second input signal of a given radio frequency, the combination of: means for producing a third signal of said given frequency and bearing a fixed phase quadrature relation to said first input signal; means for producing a fourth signal of said given frequency and bearing a fixed phase opposition relation to said second signal; two pair of rectifiers; a load resistance for each of said rectifiers; circuit means for applying to the respective rectifiers of one pair the vector sums of said first input signal plus said fourth signal and said first input signal and said second input signal; circuit means for applying to the respective rectifiers of the other pair the vector sums of said third signal plus said fourth signal and said third signal plus said second input signal; and circuit means for each of said pairs of rectifiers for effecting an algebraic addition of the direct potentials produced across the load resistances thereof, whereby the two resulting direct potentials bear the same magnitude relation to each other as exists between the right angle components of said phase angle.

2. In a phase discriminator circuit for determining the phase angle between a first and a second input signal of a given radio frequency, the combination of: means for producing a third signal of said given frequency and bearing a fixed phase quadrature relation to said first input signals; means for producing a fourth signal of said given frequency and bearing a fixed phase opposition relation to said second signal; two pair of rectifiers; a load resistance for each of said rectifiers; circuit means for applying to the respective rectifiers of one pair the vector sums of said first input signal plus said fourth signal and said first input signal and said second input signal; circuit means for applying to the respective rectifiers of the other pair the vector sums of said third signal plus said fourth signal and said third signal plus said second input signal; circuit means for each of said pairs of rectifiers for effecting an algebraic addition of the direct potentials produced across the load resistances thereof, whereby the two resulting direct potentials bear the same magnitude relation to each other as exists between the right angle components of said phase angle; and a permanent magnet goniometer connected to said last-named circuit means to effect a vector addition of the two components represented by said resulting direct potentials to thereby indicate the direction of their resultant representing said phase angle.

3. In a phase discriminator circuit for determining the phase angle between a first and a second input signal of a given radio frequency, the combination of: means for producing a third signal of said given frequency and bearing a fixed phase quadrature relation to said first input signals; means for producing a fourth signal of said given frequency and bearing a fixed phase opposition relation to said second signal; two pair of rectifiers; a load resistance for each of said rectifiers; circuit means for applying to the respective rectifiers of one pair the vector sums of said first input signal plus said fourth signal and said first input signal and said second input signal; circuit means for applying to the respective rectifiers of the other pair the vector sums of said third signal plus said fourth signal and said third signal plus said second input signal; circuit means for each of said pairs of rectifiers for effecting an algebraic addition of the direct potentials produced across the load resistance thereof, whereby the two resulting direct potentials bear the same magnitude relation to each other as exists between the right angle components of said phase angle; and a permanent magnet goniometer connected to said last-named circuit means to effect a vector addition of the two components represented by said resulting direct potentials to thereby indicate the direction of their resultant representing said phase angle, said goniometer including a registering mechanism for indicating the algebraic sum of phase angle changes exceeding a full electrical circle.

4. In a phase discriminator circuit for determining the phase angle between a first and a second input signal of a given radio frequency, the combination of: means for producing a third signal of said given frequency and bearing a fixed phase quadrature relation to said first input signals; means for producing a fourth signal of said given frequency and bearing a fixed phase opposition relation to said second signal; two pairs of rectifiers; a load resistance for each of said rectifiers; circuit means for applying to the respective rectifiers of one pair the vector sums of said first input signal plus said fourth signal and said first input signal and said second input signal; circuit means for applying to the respective rectifiers of the other pair the vector sums of said third signal plus said fourth signal and said third signal plus said second input signal; circuit means for each of said pairs of rectifiers for effecting an algebraic addition of the direct potentials produced across the load resistances thereof to produce a pair of resulting potentials; a pair of magnetic field windings disposed at right angles to each other; a permanent magnet mounted for pivotal movement into alignment with the resultant field produced by said windings; and means for applying to said windings respective potentials proportional to said resulting potentials, whereby said phase angle is indicated by the angular position of said permanent magnet.

5. In a phase discriminator circuit for determining the phase angle between a first and a second input signal of a given radio frequency, the combination of: means for producing a third signal of said given frequency and bearing a fixed phase quadrature relation to said first input signals; means for producing a fourth signal of said given frequency and bearing a fixed phase opposition relation to said second signal; two pairs of rectifiers; a load resistance for each of said rectifiers; circuit means for applying to the respective rectifiers of one pair the vector sums of said first input signal plus said fourth signal and said first input signal and said second input signal; circuit means for applying to the respective rectifiers of the other pair the vector sums of said third signal plus said fourth signal and said third signal plus said second input signal; circuit means for each of said pairs of rectifiers for effecting an algebraic addition of the direct potentials produced across the load resistances thereof to produce a pair of resulting potentials; a pair of magnetic field windings disposed at right angles to each other; a permanent magnet mounted for pivotal movement into alignment with the resultant field produced by said windings; means for applying to said windings respective potentials proportional to said resulting potentials, whereby said phase angle is indicated by the angular position of said permanent magnet; and a registering mechanism coupled to said magnet for indicating phase angle changes exceeding a full electrical circle.

6. A phase comparator for indicating the phase difference between two alternating current signals comprising a first and a second phase discriminating circuit, each including a pair of linear rectifiers for producing a pair of output potentials representative respectively of the sine and cosine of the angle of said phase difference, and an electro-mechanical means operated by said output potentials to provide a mechanical movement which is substantially linear with repect to phase difference and having a direction of movement which is indicative of an increasing or decreasing phase difference.

7. A phase comparator as set forth in claim 6 which includes circuit means for applying to each of said linear rectifiers a different combination signal derived from both of said alternating current signals, said combination signals being different combinations of one of said alternating current signals, a signal of opposite phase to said one alternating current signal, the other of said alternating current signals, and a signal at phase quadrature to said other alternating current signal.

WILLIAM J. O'BRIEN.

REFERENCES CITED

The following references are of record in the file of this patent:

UNITED STATES PATENTS

| Number | Name | Date |
|---|---|---|
| 2,281,995 | Purington | May 5, 1942 |
| 2,405,073 | Troell | July 30, 1946 |
| 2,467,361 | Blewett | Apr. 12, 1949 |